(12) United States Patent
Lindsey et al.

(10) Patent No.: US 10,933,804 B2
(45) Date of Patent: Mar. 2, 2021

(54) SCHOOL BUS CHILD SAFETY SYSTEM, COMPONENTS, AND METHODS OF MAKING AND USING SAME

(71) Applicant: Universal Safety Net Solutions LLC, East Hartford, CT (US)

(72) Inventors: Shelley R Lindsey, East Hartford, CT (US); Stephen Lindsey, East Hartford, CT (US); Maximillian Xavier, Vernon, CT (US)

(*) Notice: Subject to any disclaimer, the term of this patent is extended or adjusted under 35 U.S.C. 154(b) by 0 days.

(21) Appl. No.: 16/506,524

(22) Filed: Jul. 9, 2019

(65) Prior Publication Data

US 2020/0130569 A1 Apr. 30, 2020

Related U.S. Application Data

(60) Provisional application No. 62/695,566, filed on Jul. 9, 2018.

(51) Int. Cl.
| | | |
|---|---|---|
| *B60Q 1/50* | (2006.01) | |
| *G08G 1/005* | (2006.01) | |
| *B60Q 1/26* | (2006.01) | |
| *E01F 9/608* | (2016.01) | |
| *F21S 43/31* | (2018.01) | |

(52) U.S. Cl.
CPC ............ *B60Q 1/50* (2013.01); *B60Q 1/2615* (2013.01); *B60Q 1/2657* (2013.01); *G08G 1/005* (2013.01); *E01F 9/608* (2016.02); *F21S 43/31* (2018.01)

(58) Field of Classification Search
CPC ...... B60Q 1/50; B60Q 1/2615; B60Q 1/2657; G08G 1/005; E01F 9/608; F21S 43/31
See application file for complete search history.

(56) References Cited

U.S. PATENT DOCUMENTS

| | | | | |
|---|---|---|---|---|
| 5,038,136 | A * | 8/1991 | Watson | B60Q 1/50 116/50 |
| 5,382,953 | A * | 1/1995 | Hauptli | B60Q 1/50 340/433 |
| 5,793,420 | A * | 8/1998 | Schmidt | B60R 1/00 340/433 |
| 5,847,642 | A * | 12/1998 | Esposito | B60Q 1/50 340/433 |
| 9,718,405 | B1* | 8/2017 | Englander | B60R 1/00 |
| 2003/0070603 | A1* | 4/2003 | VanderMolen | B60Q 1/50 116/28 R |
| 2006/0269105 | A1* | 11/2006 | Langlinais | G06K 9/20 382/105 |
| 2008/0157945 | A1* | 7/2008 | Bowler | G08G 1/0175 340/433 |
| 2009/0195651 | A1* | 8/2009 | Leonard | B60R 1/00 348/148 |
| 2009/0273941 | A1* | 11/2009 | Englander | B60Q 1/323 362/464 |

(Continued)

*Primary Examiner* — Rufus C Point
(74) *Attorney, Agent, or Firm* — UConn IP Law Clinic

(57) ABSTRACT

Disclosed herein is school bus safety device comprising a rigid arm configured to move outwardly from a school bus in order to block vehicular traffic, and to be stored along the side, rear, front, bottom or top of the school bus when not in use, and a recording device mounted proximate or on the arm and being configured to record a position and/or movement of a nearby vehicle. A school bus including the device, and corresponding methods, also are disclosed.

20 Claims, 3 Drawing Sheets

(56) References Cited

U.S. PATENT DOCUMENTS

| | | | |
|---|---|---|---|
| 2012/0177336 A1* | 7/2012 | Bhan | H04N 5/85 386/224 |
| 2012/0307064 A1* | 12/2012 | Schenken | G08G 1/01 348/149 |
| 2013/0279742 A1* | 10/2013 | Howard | G06K 9/00791 382/103 |
| 2015/0084790 A1* | 3/2015 | Arpin | G08G 1/04 340/936 |
| 2020/0130569 A1* | 4/2020 | Lindsey | B60Q 1/2692 |

* cited by examiner

SCHOOL BUS CHILD SAFETY SYSTEM, COMPONENTS, AND METHODS OF MAKING AND USING SAME

CROSS-REFERENCE TO RELATED APPLICATIONS

This application claims the benefit of U.S. Provisional Patent Application No. 62/695,566 filed on Jul. 9, 2018.

BACKGROUND

In today's modern world with advanced technology, recurring problems continue to arise resulting in children being struck by cars while crossing the street to get on or off of the school bus that is providing transportation service. According to the National Highway Traffic Safety Administration (NHTSA), there have been 363,839 fatal motor vehicle accidents in the U.S. since 2001. Of those, 1368 were considered school bus-related. A school bus-related crash is defined by NHTSA to be any crash which directly or indirectly involves a school bus or non-school bus functioning as a school bus, transporting children to or from school or activities associated with school. This includes accidents involving school children who are actually pedestrians on roadways prior to entering or after already exiting a school bus. Of these accidents, school bus occupants accounted for 7 percent of fatalities, and non-occupants including pedestrians and bicyclists accounted for 21 percent. The majority of these who died in school bus-related accidents (72 percent) were occupants of other vehicles involved.

There have been 123 school-age pedestrians (younger than 19) killed since 2001 in school bus-related crashes. Of these, over two-thirds (69 percent) were struck by school buses, 26 percent by other vehicles involved in the crashes, and 5 percent by non-school bus vehicles that were functioning as school buses. Forty percent of the school-age children killed in school bus transpiration-related crashes were between the ages of 5 and 7. There are 9 school-age pedestrians killed on average by school transportation vehicles each year, and 3 are killed by other vehicles involved in school-bus-related crashes. Between the hours of 3 p.m. and 4 p.m., more school-age pedestrians are killed than at any other time of day.

It would be useful to develop a system to improve school bus safety.

SUMMARY

One embodiment disclosed herein is a school bus safety device comprising a rigid arm configured to move outwardly from a school bus in order to block vehicular traffic, and to be stored on the school bus when not in use, and a recording device mounted on or proximate the arm and being configured to record a position and/or movement of a nearby vehicle. In some cases, the arm is retractable.

In embodiments, the safety device further comprises lights disposed along at least a portion of the length of the arm. The arm is configured to be mounted to a school bus with a mounting device. In embodiments, the mounting device provides for pivotal movement of the arm between an operating position and a storage position. In certain cases, the arm is both pivotable and retractable.

In embodiments, the recording device provides a real-time video feed to a remote computer. In some cases, the device further including at least one sensor formed on the arm and being configured to sense at least one of a position and a speed of a nearby vehicle. The sensor can be a speed detector. In certain cases, the device further comprises a speaker configured to emit a warning sound. In embodiments, the device includes a transmitter configured to immediately transmit data to a remote computer.

Another embodiment is school bus having the safety device described in the previous paragraphs mounted thereon.

A further embodiment is a method of increasing school bus safety comprising employing a safety device on a school bus, the safety device comprising a rigid arm configured to move outwardly from a school bus in order to block vehicular traffic, and to be stored on the exterior of school bus when not in use, and a recording device mounted on the arm and being configured to record a position and/or movement of a nearby vehicle.

DETAILED DESCRIPTION

Figure 1A:
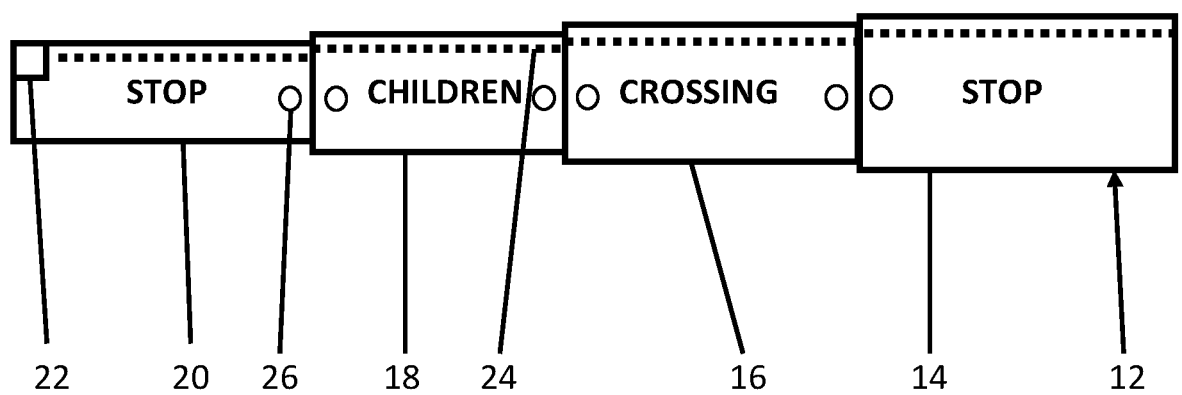
FIG. 1A is a side view of a school bus safety arm according to a first embodiment.

The school bus safety device described herein is configured to prevent motorists from passing a school bus and hitting an innocent child crossing the street, thereby prevent injury or death. The school bus child safety system has an arm that can be moved to extend about 6 feet to about 12 feet, or about 7 feet to about 11 feet, or about 7.5 feet to about 10 feet into the road, acting as an obstruction. In some cases the arm can be telescopically extended and retracted. In some embodiments, its dense metaphysical properties and elements constructed are designed as a deterrent able to withstand impact up to speeds of at least about 30 mph, or at least about 40 mph, or at least about 55 mph. In embodiments, the device includes at least one camera which may have a panoramic lens and may have real time streaming capability to take pictures and film traffic violators. In embodiments, the video footage, or data obtained from the video footage, can be transmitted electronically, such as by satellite or another wireless technique, to local DMV, DOT and/or local police authorities. In some cases radar and/or motion sensor retention technology is embedded into the construction of the safety arm, resulting in issuance of citations. The arm also may comprise bright LED flashing lights which may read in the middle of the safety stick "Stop-Children Crossing," sirens and/or audible safety prompts. Once activated, the imposing arm extends into a traffic lane, usually an adjacent traffic lane, then when deactivated by the bus driver it collapses and/or is pivoted to be alongside, under, on top of, on the rear side of, or inside the bus. The device is configured to save the lives of children and other pedestrians.

In embodiments, the device comprises a telescoping arm with flashing lights for obstructing traffic alongside a stopped school bus. This school bus safety feature intercepts motorists who might otherwise drive around the left side of the bus while schoolchildren are being loaded or unloaded.

It enhances safety around school buses by keeping unsuspecting youngsters from being accidently struck and killed by other moving vehicles.

The (usually) 6-10 foot long device can be comprised primarily of a pivoting and telescoping obstruction arm, a speed detector and/or camera; flashing lights, wiring, an electric drive motor, and hardware. The motor and lights are wired to the DC electrical system of the school bus for power, or can have a separate power system.

The arm typically is mounted to the left side of the bus or the rear of the bus and is stored in a collapsed state adjacent the vehicle when not in use. In some cases, the device is mounted to the lower left side of the bus. In some embodiments, this arm is capable of being telescopically expanded outward 90 degrees at a right angle with the bus body length when the bus makes a stop to pick or drop off children.

In some cases, the imposing horizontal arm includes flashing high-visibility LED lights on either or both the front and back sides that read "STOP—CHILDREN CROSSING." The lights inside the arm can be colored red, white, and blue like a police vehicle. This makes the extended arm highly visible from a distance. Additionally, an optional audible sound alerts motorists of the need to stop.

During normal travel conditions, the arm is neatly collapsed alongside the bus. If the driver stops to pick up schoolchildren, this device is pivoted outwardly, usually to the left side, to block the adjacent lane.

Any motorist who was considering passing the stopped bus with lights flashing is both clearly warned and also is physically obstructed by the arm. Stopping traffic in this manner helps prevent unsuspecting children attempting to cross the street from being struck and killed by a passing motorist.

In embodiments, the device includes a radar detector to detect the speed of approaching vehicles in violation of traffic laws and public safety. Also, in some cases, a camera is integrated into the outer end of the stick, right inside the pole where the lights are positioned. The camera alternatively can be positioned at other locations on the arm or on the bus itself.

In addition, the device may include sensors to detect when a car is too close to the school bus. If too close, the camera can take a photograph of a driver, automobile or license plate and send it to the proper authorities to issue a citation.

The device described herein fulfills the need for a physical barrier for stopping motorists at school buses picking up and dropping off youngsters. Additional appealing features of "SCHOOL BUS CHILD SAFETY SYSTEM" are its automatic operation, safety, and the effective obstruction created. Instead of a careless motorist simply driving past a stopped school bus, this telescoping arm serves as a physical obstruction. The extended arm combined with bright flashing lights stops motorists so small children can safely cross the street. It keeps vulnerable youngsters from being stuck and seriously injured or possibly even killed.

The "SCHOOL BUS CHILD SAFETY SYSTEM" provides peace of mind for safety-conscious school bus drivers and parents by stopping motorists who might otherwise be daydreaming, distracted, drowsy, or simply in a hurry to get to work. In embodiments, the electric and electronic features of the device are weatherproof and adaptable to different types of aftermarket and new-production school buses.

Referring to FIG. 1A, a first embodiment of an arm for a school bus safety system is shown and is generally designated as 12. The arm 12 is a telescoping arm comprising generally hollow tubes that can optionally contain wiring (if the lights and/or camera are hard-wired). In the version shown in FIG. 1, the telescoping arm 12 includes a first section 14 having the largest diameter and being configured to be mounted to a bus, a slightly smaller second section 16 directly connected to the first section 14, a third section 18 connected to the outer end of the second section 16, and a fourth section 20 directly connected to the outer end of the third section 18. When the arm 12 is in a collapsed state, all of the sections are disposed inside the first section 14, except that in some cases the outer end of the fourth section will remain partially outside of the first section 14 if necessary to accommodate the camera and/or sensor, such as a speed detector 22. In other cases, the camera and/or speed detector 22 is/are configured and positioned to enable the fourth section 20 to be fully inside the third section 18, second section 16 and first section 14 when the arm is in a collapsed state of non-use. In another embodiment that is not shown in the Figures, the arm initially pivots vertically upwardly or downwardly to move from a storage position to an operating position. Each section includes at least one light 26 and a row of lights or reflectors 24 near the upper side of the arm section 14, 16, 18, 20.

One advantage of using a telescoping arm with a camera that is exposed when the arm is in a retracted configuration is that the bus optionally can operate and move with the arm pivoted outwardly but without the arm extended. Thus, in this case, the camera can record movement of nearby vehicles even when the arm is not fully extended.

In some embodiments, the arm 12 can be pivoted horizontally outwardly from the school bus, such that it is generally perpendicular to the side wall of the school bus, without being fully extended, allowing for the camera to take photos and/or video of vehicles behind or alongside the bus. In other cases, the camera is configured to take photos and/or video when the arm 12 is both retracted and positioned alongside the school bus, extended in a direction generally parallel to the school bus. In this configuration, the camera may be located on the terminal end of the arm 12 or on the school bus itself, rather than on the side of the arm 12, such that it can take photos in a rearward direction of activity behind the bus.

Figure 1B:
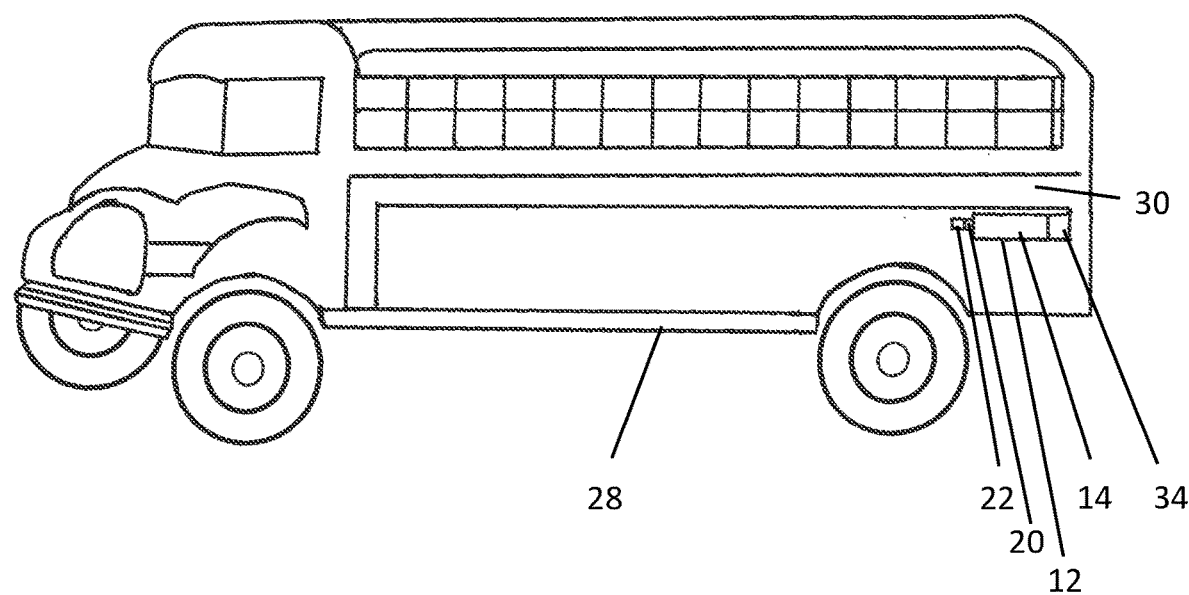
FIG. 1B is a side view of a school bus having the safety arm of FIG. 1A mounted on the left side of the school bus near the rear end of the school bus.

FIG. 1B shows the arm 12 mounted to a school bus 28. The first section 14 of the arm 12 is mounted to the bus 28 with a mounting device 34. The arm 12 is both pivotable and retractable. When the arm 12 is deployed, it pivots horizontally outwardly away from the left side 30 of the bus 28 such that it is substantially perpendicular to the plane of the left side 30 of the bus 28, and then telescopes linearly outwardly, away from the bus 28, into the adjacent lane of the road. The recording device 22 is positioned at or near the terminal end of the distal section of the telescoping arm. In the illustrated embodiment, the recording device 22 is disposed on, or formed on, the fourth section 20. The recording device 22 can be a wireless camera or a hard-wired camera.

The safety device usually includes a transmitting device configured to transmit data from at least one of the recording device and a sensor, such as a speed sensor, to a remote computer. Typically, this is part of the recording device 22. While FIG. 1B shows the arm 12 being mounted to the left side of the bus, it alternatively can be mounted to the rear side of the bus or underside of the bus. In countries where traffic drives on the left side of the road, the arm would be mounted to the right side of the bus.

Figure 2:
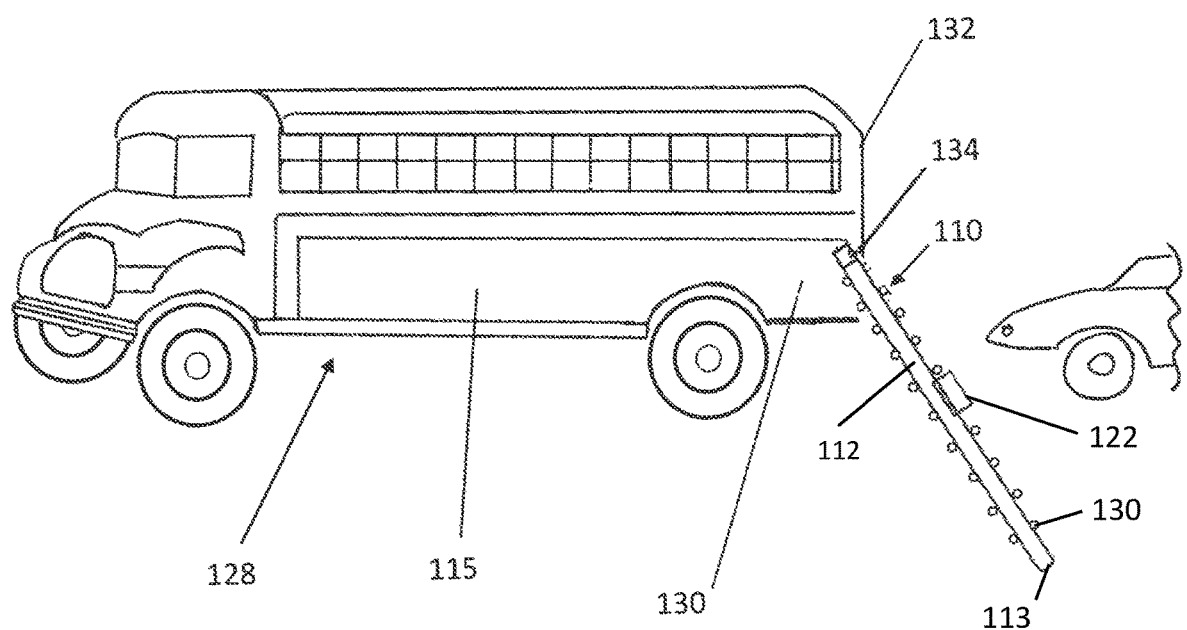
FIG. 2 shows a school bus having a second embodiment of a safety device mounted to the exterior of the bus at the rear end.

FIG. 2 shows a school bus safety system 110 that includes a pivotable but non-retractable arm 112. The arm 112 is mounted near the rear side 132 of a school bus 128 in a manner such that the outer terminal end 113 of the arm 112 is disposed proximate the middle section 115 of the side 130 of the school bus when the arm 112 is in a storage position. For countries in which vehicles drive on the right side of the road, the arm 112 is mounted on the left side 130 of the bus 128, or on the rear side 132, with a support 134. In embodiments, the support 134 includes a pivot that enables the arm 112 to be pivoted outwardly into the street. The pivot part of the support 134 is operated by a power source which may be tied into, or separate from the electrical system for the bus itself. While the arm 112 pivots, it is also contemplated that the system 110 can include a telescoping arm such as is shown in FIG. 1 rather than a non-telescoping arm. The arm 112 can have a camera 122 mounted at any point along its length. Alternatively, the camera can be mounted on the bus itself. The camera 122 shown in FIG. 2 is shown as being positioned along the middle portion of the length of the arm 112. Lights 130 are positioned on the back and optionally also on the front side of the arm 112 along substantially its entire length.

The driver of the school bus can control the movement of the arm using a wireless or wired controller. In embodiments, the controller is mounted on or proximate the dashboard of the bus.

Known recording device technology can be used in the embodiments disclosed herein. Non-limiting examples of recording device technology are described in US Published Patent Application No. 2007/0260375 and US2009/0195651.

Other Variations

In some cases, the device is included in the construction of new school buses. In other cases, the device is configured for installation on aftermarket school buses.

In embodiments, the telescoping safety arm can be formed from tubular metal, such as aluminum or stainless steel, for a high strength-to-weight ratio and corrosion resistance. The reinforced and anodized aluminum or stainless steel tubing can be cut to length and drilled where required for installation of the wiring for the lights. Another non-limiting example of a suitable material for making the arm is fiberglass. In some cases, molded seals comprising synthetic or natural rubber, such as neoprene, or another elastomeric material, can also be included where needed for all-weather protection.

For new school bus production, the device can be installed in standard assembly line fashion. When an existing school bus is retrofitted, the power system for the device can be integrated into the electrical system of the bus, or a separate system can be installed and appropriately powered.

In embodiments, the arm is stored on the exterior of the school bus when not in use. In some cases, the arm is stored inside the outer shell of the school bus when not in use to protect the device from weather-related wear. The storage area can be inside the occupant's portion of the bus, such as in a box-shaped enclosure beneath a seat, or between the outer shell of the bus and the portion of the bus configured to hold passengers.

Packaging

In embodiments, the "SCHOOL BUS CHILD SAFETY SYSTEM" is packaged in a corrugated cardboard box. A pamphlet optionally can be included with each package that details instructions for installation, use, and care. Cardboard inserts can be inserted into the package to protect the product.

Advantages

The "SCHOOL BUS CHILD SAFETY SYSTEM" can help prevent senseless injuries and deaths involving small school children on roadways. Motorists who are careless, distracted, or oblivious and commonly break the law are forced to stop every time a school bus drops off or loads children. With the activated extension arm is directed outwardly beyond the left (or right) side of the bus, drivers have no choice but to stop.

The "SCHOOL BUS CHILD SAFETY SYSTEM" can be designed to be automatically activated with the rest of the safety equipment and readily adaptable to virtually any school bus. The telescoping arm can be designed to neatly collapse against the left side of the bus when not in use for compact "storage."

Once activated, when the imposing arm extends outwardly into the next lane, it serves as a visual and physical deterrent for would-be scofflaws. The bright flashing lights attract added attention from a distance so the situation is easily recognizable. The warning can be easily interpreted even in poor visibility conditions like fog, rain, and snow.

In addition to blocking the road and flashing "STOP—CHILDREN CROSSING" messages, as indicated above, some embodiments of this device include a radar detector, sensors, and a camera. The radar detector detects drivers approaching too quickly, while the camera photographs violators that get too close so they can be cited by the authorities.

Although children are taught and reminded how to safely board and depart a school bus, they have a tendency to become complacent and distracted. This is especially a problem when departing the bus after school when children might be tired, daydreaming, talking amongst themselves, or involved in horseplay. With this device in use, a child darting across the road in front of the stopped bus can safely cross with full protection being afforded by the extended arm. This helps to ensure a high level of safety for youngsters on a consistent basis.

A number of alternatives, modifications, variations, or improvements therein may be subsequently made by those skilled in the art, which are also intended to be encompassed by the following claims.

What is claimed is:

1. A school bus safety device comprising:
    a rigid arm configured to move outwardly from a school bus in order to block vehicular traffic, and to be stored on the school bus when not in use,
    a sensor formed on the arm, the sensor being configured to sense at least one of a position and a speed of a nearby vehicle, and
    a recording device mounted on the arm, the recording device being configured to record at least one of the position and a movement of the nearby vehicle, and provide a real-time video feed to a remote computer.

2. The school bus safety device of claim 1, further comprising lights disposed along at least a portion of the length of the arm.

3. The school bus safety device of claim 1, wherein the arm is configured to be mounted to a school bus with a mounting device.

4. The school bus safety device of claim 3, wherein the mounting device provides for pivotal movement of the arm between an operating position and a storage position.

5. The school bus safety device of claim 3, wherein the arm is retractable.

6. The school bus safety device of claim 3, wherein the arm is pivotable.

7. The school bus safety device of claim 3, wherein the arm is both pivotable and retractable.

8. The school bus safety device of claim 1, wherein the recording device is a hard-wired camera.

9. The school bus safety device of claim 1, wherein the recording device is a wireless camera.

10. The school bus safety device of claim 1, further comprising a speaker configured to emit a warning sound.

11. The school bus safety device of claim 1, further including a transmitting device configured to transmit data from at least one of the recording device and the sensor to the remote computer.

12. The school bus safety device of claim 11, further comprising a controller configured to permit the driver to operate the school bus safety device.

13. A school bus having a safety device mounted thereon, the safety device comprising:
    a rigid arm configured to move outwardly from a school bus in order to block vehicular traffic, and to be stored on the school bus when not in use, the arm having a telescoping configuration including an inner arm section, an intermediate arm section and an outer arm section,
    a sensor formed on the arm, the sensor being configured to sense at least one of a position and a speed of a nearby vehicle, and
    a recording device mounted on the arm, the recording device being configured to record at least one of the position and a movement of the nearby vehicle, and to provide a real-time video feed to a remote computer.

14. A method of increasing school bus safety comprising employing the safety device of claim 1 on a school bus.

15. A method of increasing school bus safety comprising employing a safety device on a school bus, the safety device comprising a rigid arm configured to move outwardly from a school bus in order to block vehicular traffic, and to be stored on the exterior of school bus when not in use, a sensor formed on the arm, the sensor being configured to sense at least one of a position and a speed of a nearby vehicle, and a recording device mounted on the arm and being configured to record at least one of the position and a movement of the nearby vehicle, the recording device providing a real-time feed to a remote computer.

16. The method of claim 15, wherein the recording device comprises a camera.

17. The method of claim 16, wherein the camera comprises a video camera.

18. The school bus safety device of claim 5, wherein the arm includes telescoping inner, intermediate and outer arm sections.

19. The school bus safety device of claim 18, wherein at least one of the sensor and the recording device is configured to be mounted to the outer arm section.

20. The school bus of claim 13, wherein the school bus has a front end portion and a back end portion, and the safety device is mounted to the back end portion.

* * * * *